T. P. CURRY.
CAPSULE FILLING MACHINE.
APPLICATION FILED MAR. 18, 1907.
915,561.
Patented Mar. 16, 1909.
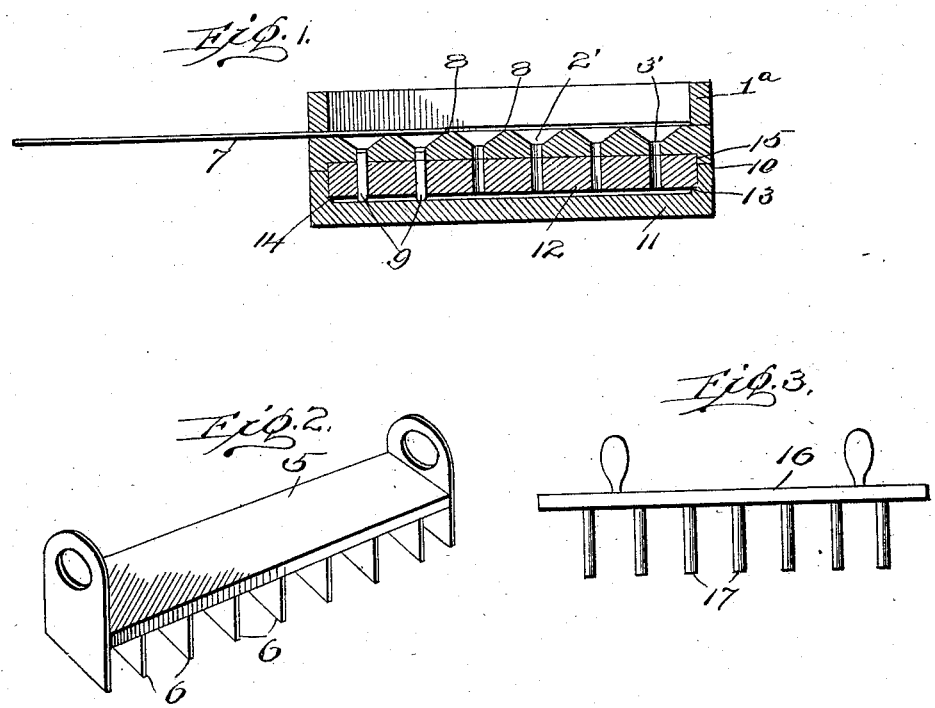
Witnesses
Inventor
Thomas Porter Curry
By Mason, Fenwick & Lawrence
his Attorneys

UNITED STATES PATENT OFFICE.

THOMAS PORTER CURRY, OF DANVILLE, KENTUCKY.

CAPSULE-FILLING MACHINE.

No. 915,561.  Specification of Letters Patent.  Patented March 16, 1909.

Application filed March 18, 1907. Serial No. 363,019.

*To all whom it may concern:*

Be it known that I, THOMAS PORTER CURRY, a citizen of the United States, residing at Danville, in the county of Boyle and State of Kentucky, have invented certain new and useful Improvements in Capsule-Filling Machines; and I do hereby declare the following to be a full, clear, and exact description of the invention, such as will enable others skilled in the art to which it appertains to make and use the same.

This invention relates to devices for holding and filling a number of capsules with powder and has especial reference to that class of devices in which the capsules are supported beneath a trough-shaped receptacle, and powder is divided into portions with which the capsules are filled.

The invention has for its object to provide a new and improved device of this character, constructed and arranged, as hereinafter set forth and claimed.

In the accompanying drawings:—Figure 1 is a longitudinal vertical section through a capsule filling machine embodying the features of the invention. Fig. 2 is an instrument for evenly dividing the powder contained in the receptacles shown in Fig. 1. Fig. 3 is a rammer for forcing the powder into the capsules.

In providing a device or apparatus for filling capsules I preferably form a trough-shaped receptacle 1ª which is provided with a plurality of depressed or hollowed-out portions 2' and a plurality of openings 3'. The depressed portions 2' with their apertures 3' are designed to extend the full length of receptacle 1ª. In order to properly level the powder in receptacle 2' so as to have an even depth over the entire receptacle so as to provide any desired quantity, I provide a false bottom or slide 7 which is adapted to slide over and cover the recess portion 2'. After the slide 7 has been forced over the recess portion 2' a powder is placed in the receptacle 1ª and the surface thereof leveled or evened off by a square ended knife or in any convenient manner, and the cutter or knife 5 is placed in position in receptacle 1ª and forced downward until the blades 6 contact with the false bottom or slide 7. As will be evident this will divide the powder into predetermined lots. The blades 6 are designed to be spaced apart sufficiently to be located between apertures 3', and when slide 7 is removed the blades 6 will drop down upon projecting portions 8 of the bottom of receptacle 1ª. The slide 7 is removed while the knife or cutter 5 is in position so that the powder divided thereby is held in position above the recess portion 2' and is not permitted to escape therefrom except into the recess portions 2' and apertures 3' into suitable capsules as 9—9.

A capsule receiver or holder 10 is provided which contains any desired number of capsules, and so spaced as to register with apertures 3'. The capsule receiver 10 is provided with a box or housing 11 and an apertured block or member 12 which is provided with apertures of such size as to receive capsules that are designed to register and have their ends fit in apertures 3' as clearly seen in Fig. 1. The block or apertured member 12 is adapted to fit in housing 11 and is supported by offset portions 13 and 14 therein. By this construction the bottom of the housing 11 and the bottom of the apertured member 12 is spaced apart any desirable distance and the top of the apertured member 12 projects above the top of the housing 11 such a distance as to snugly fit in a recess portion 15 in receptacle 1ª.

When it is desired to use the apparatus, the capsule receiver 10 is filled with capsules and placed beneath the receptacle 1ª. After the capsules have been placed in the receiver 10 the same will project slightly above the apertured member 12, and when the apertured member 12 is placed in the hollowed out portion 15 the ends of the capsules will be forced into the apertures 3' ready for receiving powder from the receptacle. The receptacle 1ª is then filled with powder as above described, divided into desired lots, and then forced into the capsules. After the capsules have all been filled the receiver 10 is removed and then the apertured member 12 is removed from its housing 11. The capsules may be removed from the apertured member 12 by pressing on the lower end thereof by the hand or by simply placing the apertured member 12 on any solid surface and press downward, which will have the effect of forcing the capsules a considerable distance upward. The capsules then may be removed and provided with caps in any desired way.

In use after the powder has been divided into predetermined lots and the false bottom 7 removed the same may be permitted to feed into the capsules 9—9, and, if desired, be assisted in feeding therein by any convenient means, but I find it desirable in some instances to use a rammer 16 for forcing the same into the capsules. The rammer 16 is provided with a number of circular projections 17 adapted to fit into the capsules or spaced a predetermined distance apart so as to register with all the apertures 3' and consequently with the capsules 9—9.

Having thus fully described my invention, what I claim as new and desire to secure by Letters Patent is:—

A capsule filling apparatus of the character described, comprising a main member having a longitudinal trough with its bottom provided with a series of tapering apertures and extended holes at the bottom of said apertures to receive capsules, said member also having a longitudinal recess in its bottom, surrounded by a depending flange, a removable bottom formed with a longitudinal chamber coinciding with the recessed bottom of the main chamber and having its sides abutting against the depending flange of the main chamber, a capsule holder provided with a series of perforations extending transversely through the same and coinciding with the holes in the bottom of the main chamber, said capsule holder being supported in the chamber of the removable bottom and adapted to hold capsules extending through said capsule holding member and projecting from each side thereof, a removable slide extending over the top of the tapering apertures in the bottom of the main chamber and a removable device for separating powder into portions on the top of said removable slide.

In testimony whereof I affix my signature in presence of two witnesses.

THOMAS PORTER CURRY.

Witnesses:
    EDWIN P. CURRY,
    THOMPSON CROOKS.